United States Patent [19]

Satta et al.

[11] Patent Number: 5,073,771
[45] Date of Patent: Dec. 17, 1991

[54] CONTROL METHOD OF ZOOMING SCREEN

[75] Inventors: Masayuki Satta, Ebina; Katsuya Takanashi, Hadano; Kunihiro Yanagi, Sagamihara, all of Japan

[73] Assignee: Hitachi, Ltd., Tokyo, Japan

[21] Appl. No.: 305,958

[22] Filed: Feb. 2, 1989

[30] Foreign Application Priority Data

Mar. 2, 1988 [JP] Japan .................. 63-47445

[51] Int. Cl.$^5$ .............................. G09G 1/06
[52] U.S. Cl. .................... 340/721; 340/724; 340/731
[58] Field of Search .......... 340/721, 723, 724, 731, 340/706, 734

[56] References Cited

U.S. PATENT DOCUMENTS

| 4,546,349 | 10/1985 | Prohofsky et al. | 340/724 |
| 4,642,790 | 2/1987 | Minshull et al. | 340/723 |
| 4,786,897 | 11/1988 | Takanashi et al. | 340/721 |
| 4,829,294 | 5/1989 | Iwami et al. | 340/723 |

FOREIGN PATENT DOCUMENTS 55-78335 6/1980 Japan .
62-32527 2/1987 Japan .

OTHER PUBLICATIONS

Foley, "Fundamentals of Interactive Computer Graphics", Addison-Wesley Publishing Co., Reading, Mass., pp. 234-237, 1984.

Primary Examiner—Jeffery A. Brier
Assistant Examiner—Xiao M. Wu
Attorney, Agent, or Firm—Fay, Sharpe, Beall, Fagan, Minnich & McKee

[57] ABSTRACT

A display device which has a zooming function and is required to display a logical screen larger in size than a physical screen, is operated in the following manner. When an action for indicating a zooming command is taken, a first rectangular frame similar in shape to the logical screen, a second rectangular frame similar in shape to a logical area which is now displayed on the physical screen, and a third rectangular frame similar in shape to a logical area which is to be subjected to a zooming operation, are all displayed on the physical screen, and moreover the third rectangular frame can be moved to a desired position by means of a coordinate input device such as a mouse. Hence, the zooming operation and a desired logical area corresponding to the third rectangular frame placed at the desired position can be specified by a one-touch operation. Thus, the operation procedure becomes simple, and the operability of the display device is improved.

12 Claims, 11 Drawing Sheets

FIG. 4

| | |
|---|---|
| 401 — WIDTH OF LOGICAL SCREEN (LW) | |
| 402 — HEIGHT OF LOGICAL SCREEN (LH) | |
| 403 — X- AND Y-COORDINATES OF UPPER LEFT CORNER OF DISPLAYED AREA (WX1, WY1) | |
| 404 — X- AND Y-COORDINATES OF LOWER RIGHT CORNER OF DISPLAYED AREA (WX2, WY2) | |
| 405 — ZOOMING RATIO OF X-COORDINATES | |
| 406 — ZOOMING RATIO OF Y-COORDINATES | |
| 407 — X- AND Y-COORDINATES OF UPPER LEFT CORNER OF VIEWPORT (VX1, VY1) | 409 — X- AND Y-COORDINATES OF UPPER LEFT CORNER OF FIRST RECTANGULAR FRAME (R1X1, R1Y1) |
| | 410 — X- AND Y-COORDINATES OF LOWER RIGHT CORNER OF FIRST RECTANGULAR FRAME (R1X2, R1Y2) |
| | 411 — X- AND Y-COORDINATES OF UPPER LEFT CORNER OF SECOND RECTANGULAR FRAME (R2X1, R2Y1) |
| | 412 — X- AND Y-COORDINATES OF LOWER RIGHT CORNER OF SECOND RECTANGULAR FRAME (R2X2, R2Y2) |
| | 413 — X- AND Y-COORDINATES OF UPPER LEFT CORNER OF THIRD RECTANGULAR FRAME (R3X1, R3Y1) |
| 408 — X- AND Y-COORDINATES OF LOWER RIGHT CORNER OF VIEWPORT (VX2, VY2) | 414 — X- AND Y-COORDINATES OF LOWER RIGHT CORNER OF THIRD RECTANGULAR FRAME (R3X2, R3Y2) |

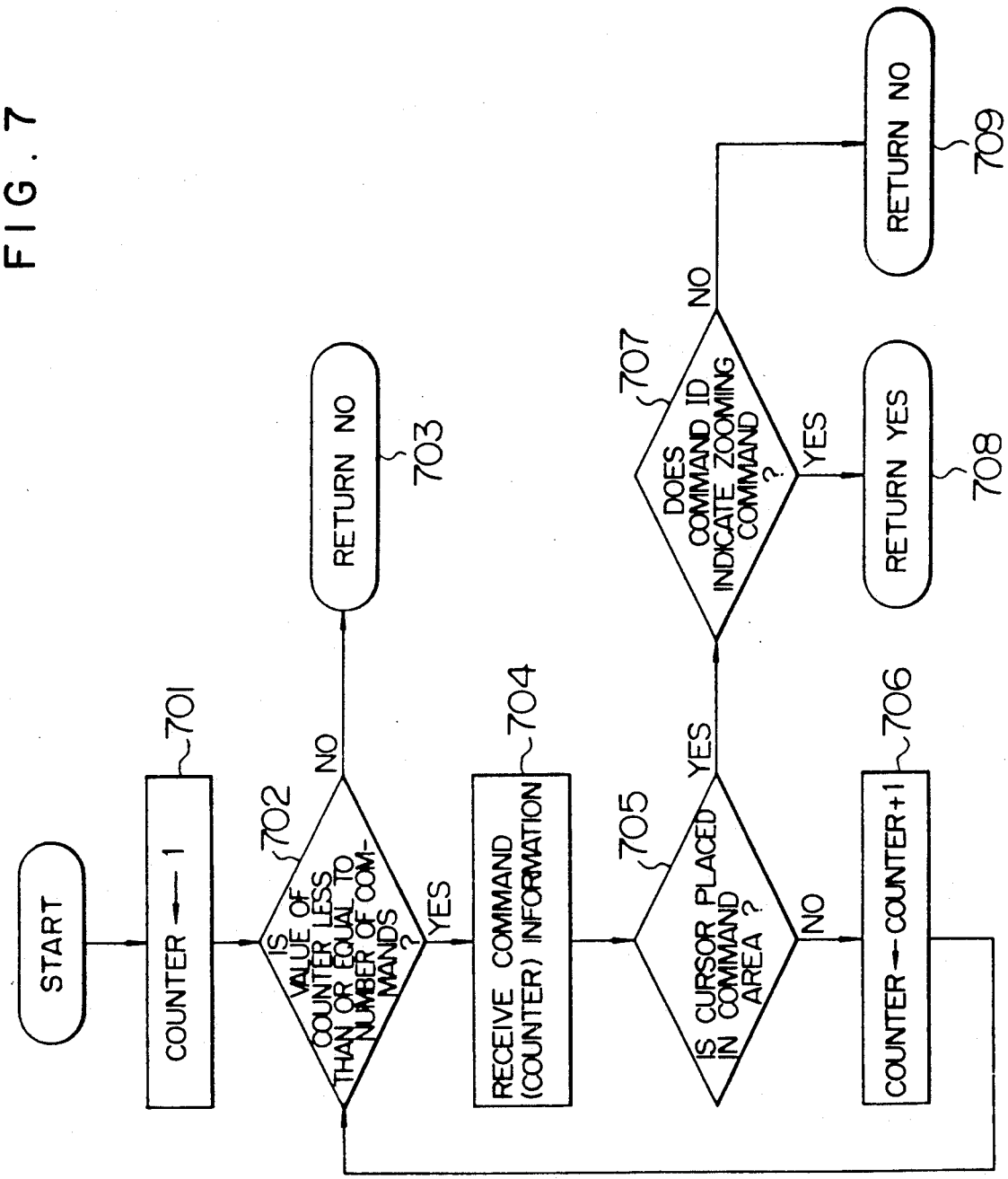

CONTROL METHOD OF ZOOMING SCREEN

BACKGROUND OF THE INVENTION

The present invention relates to a method of and an apparatus for operating a display screen, and more particularly to a method of and an apparatus for controlling a display device which is used for displaying a logical screen different in size from a physical screen and which has a function of zooming a displayed image.

In a display device for displaying a logical screen larger in size than a physical screen, only part of the logical screen is displayed on the physical screen. In this case, when it is indicated by one of input devices such as a keyboard and a pointing device (hereinafter referred to as "mouse") that a displayed area is to become narrower, an enlarged image of a character or figure is displayed on the physical screen. When the enlarged image is displayed, a displayed area of the logical screen corresponding to the physical screen becomes smaller than an initial displayed area of the logical screen. As a result, in some cases, a desired character or figure may vanish from the physical screen. In such cases, for example, a method has hitherto been used which is described in a Japanese Patent Application JP-A-55-78335. In this method, the displayed area is continuously moved in a desired direction until the desired character or figure is displayed on the physical screen.

In the above method, however, there arise three problems, a first one of which is that a zooming operation command and a displayed-area moving command are separately issued, and thus the number of operations increases. A second problem is that an operation is required to issue each of the zooming operation command and the displayed-area moving command a plurality of times till a desired area on the logical screen is displayed on the physical screen. This is because an enlarged or contacted image may be displayed in a state that the moving distance necessary for reaching the desired area on the logical screen is erroneously estimated or the movement for reaching the desired area on the logical screen is forgotten. A third problem is that it is required to display a plurality of areas of the logical screen on the physical screen till the desired area of the logical screen is displayed, and hence the amount of processing executed by a computer and the processing time thereof are increased.

SUMMARY OF THE INVENTION

A first object of the present invention is to provide a method of and an apparatus for operating a display device having a zooming function, in such a manner that an indication for requiring a zooming operation and an indication for specifying a desired logical area are given by a one-touch operation.

A second object of the present invention is to provide a method of and an apparatus for operating a display device having a zooming function, in which method and apparatus a desired logical area can be directly displayed on a physical screen without displaying any other logical area.

In order to attain the above objects, according to the present invention, there is provided a method of operating a display device having a zooming function which comprises the steps of: displaying on a physical screen a first frame similar in shape to a logical screen; displaying on the physical screen a second frame similar in shape to an area of the logical screen which is displayed on the physical screen; displaying on the physical screen a third frame similar in shape to an area of the logical screen which is to be subjected to a zooming operation; and moving the third frame to a desired position in the first frame by using one of a mouse and a keyboard.

When an operator selects an icon indicative of a zooming operation by using a coordinate input device such as a mouse, the first frame similar to the logical screen, the second frame similar to that area of the logical screen which is now displayed on a physical screen, and the third frame similar to that area of the logical screen which is to be subjected to a zooming operation, are all displayed on the physical screen at predetermined positions. Hence, the operator can readily know the present mapping relation between the logical screen and the physical screen from the first and second frames. Further, that area of the logical screen which is to be subjected to a zooming operation, can be predicted from the third frame.

When it is supposed that a desired character or figure may exist outside of a displayed area and thus may vanish from the physical screen, the operator moves the third frame to an appropriate position by using a mouse, and then a button of the mouse is released, to complete a desired indication.

As soon as the desired indication is completed, enlarged or contracted images of characters and figures which exist in a specified area, are displayed on the physical screen. That is, by using the above operating method, a zooming operation and a displayed-area changing operation can be specified at once.

Incidentally, the applicants has proposed a method of changing a displayed area, in U.S. Pat. No. 4,786,897 entitled "Display Screen Control Device", granted for a patent application Ser. No. 888,979.

BRIEF DESCRIPTION OF THE DRAWINGS

FIG. 4 is a schematic diagram showing the contents of the screen table of FIG. 3.

FIG. 7 is a flow chart showing the processing executed by a command check program.

DESCRIPTION OF THE PREFERRED EMBODIMENT

An embodiment of the present invention will be explained below in detail, with reference to the drawings.

Figure 1:
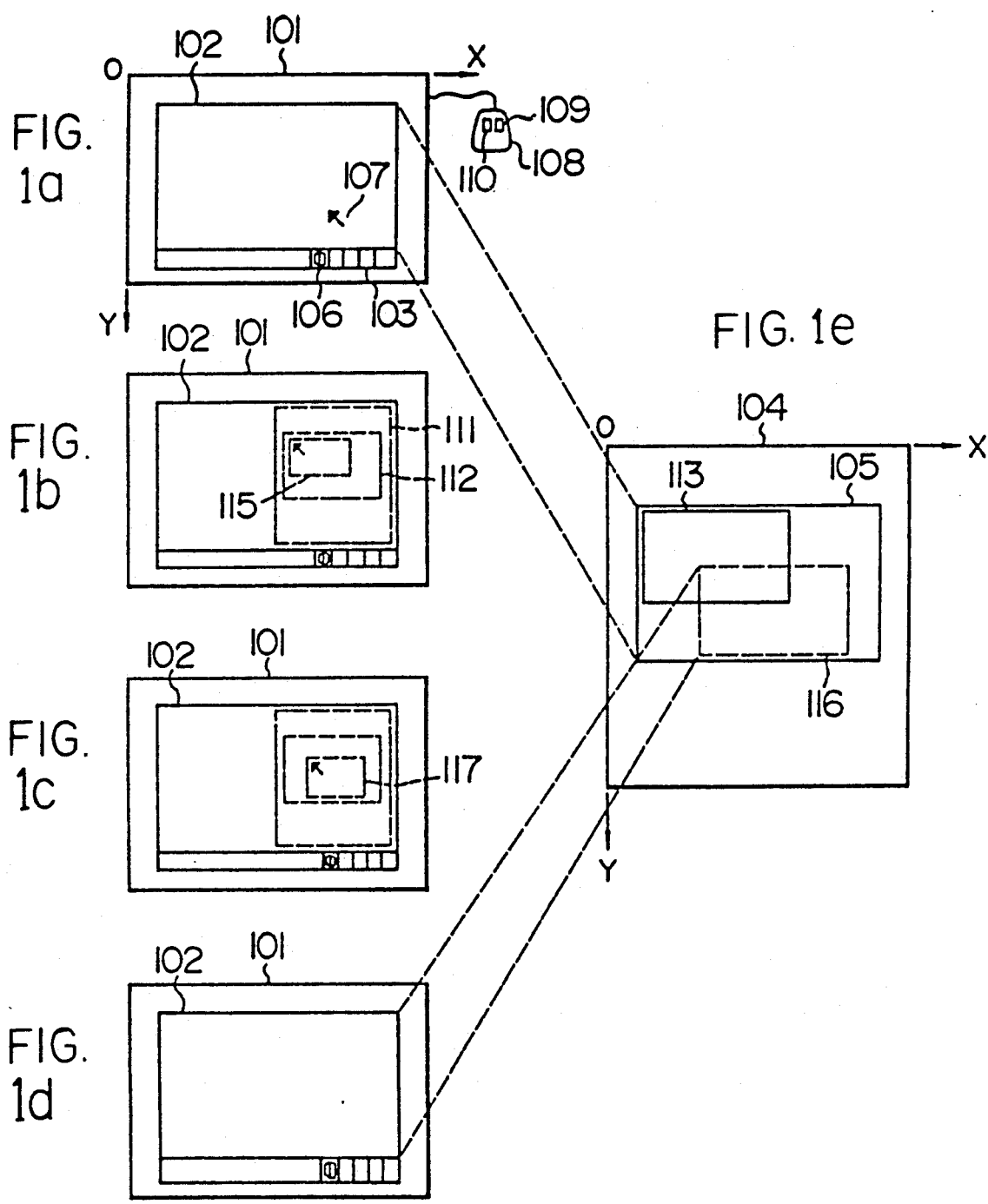
FIGS. 1(a)-1(e) show schematic diagrams for explaining the principle of the present invention.

At first, the principle and outline of the present invention will be explained, with reference to FIG. 1. FIG. 1(a) shows an example of a display screen. A displayed area 105 on a logical screen 104 shown in FIG. 1(e) is displayed in a viewport 102 of a physical screen 101 shown in FIG. 1(a). In FIG. 1(a), reference numeral 103 designates an operation menu for the viewport 102. A zooming-operation indicating icon 106 is included in the above menu. In order to display an enlarged image in a state shown in FIG. 1(a), it is necessary to move a cursor 107 which is indicated by an arrow, by using a mouse 108 so that the cursor 107 is placed on the icon 106, and to depress a right button 109 mounted on the mouse 108. When the right button 109 is depressed, a command for making the magnification of image twice larger than the present magnification is issued. While, in order to display a contracted image, it is necessary to depress a left button 110 mounted on the mouse 108. When the left button 110 is depressed, a command for making the magnification of image equal to one-half the present magnification is issued. When an operator moves the cursor 107 as above while depressing the button 109 or 110 of the mouse 108, the state of the physical screen 101 is changed as shown in FIG. 1(b). That is, the first rectangular frame 111 for indicating the logical screen 104 is displayed in the viewport 102, the second rectangular frame 112 for indicating the position and size of the present displayed area 105 relative to the logical screen 104 is also displayed in the viewport 102, and further the third rectangular frame 115 for indicating the position and size of a logical area 113 which is to be enlarged or contracted, relative to the logical screen 104 is displayed in the viewport 102.

In a case where a desired character or figure exists in the logical area 113 and thus it is unnecessary to change the logical area 113, the button 109 or 110 of the mouse 108 is released. In a case where the desired character or figure exists outside of the logical area 113 and hence it is necessary to substitute a logical area 116 shown in FIG. 1(e) for the logical area 113, the operator moves the cursor 107 in a state that the button 109 or 110 of the mouse 8 is depressed, while observing the display screen of FIG. 1(e), to move the third rectangular frame 115 to a desired position 117 as shown in FIG. 1(c).

When the button 109 or 110 of the mouse 8 is released in a state that the third rectangular frame 115 has been moved to the position 117, an enlarged or contracted image of the newly displayed area 116 of the logical screen 104 is displayed in the viewport 102 of the physical screen 101, as shown in FIG. 1(d).

Figure 2:
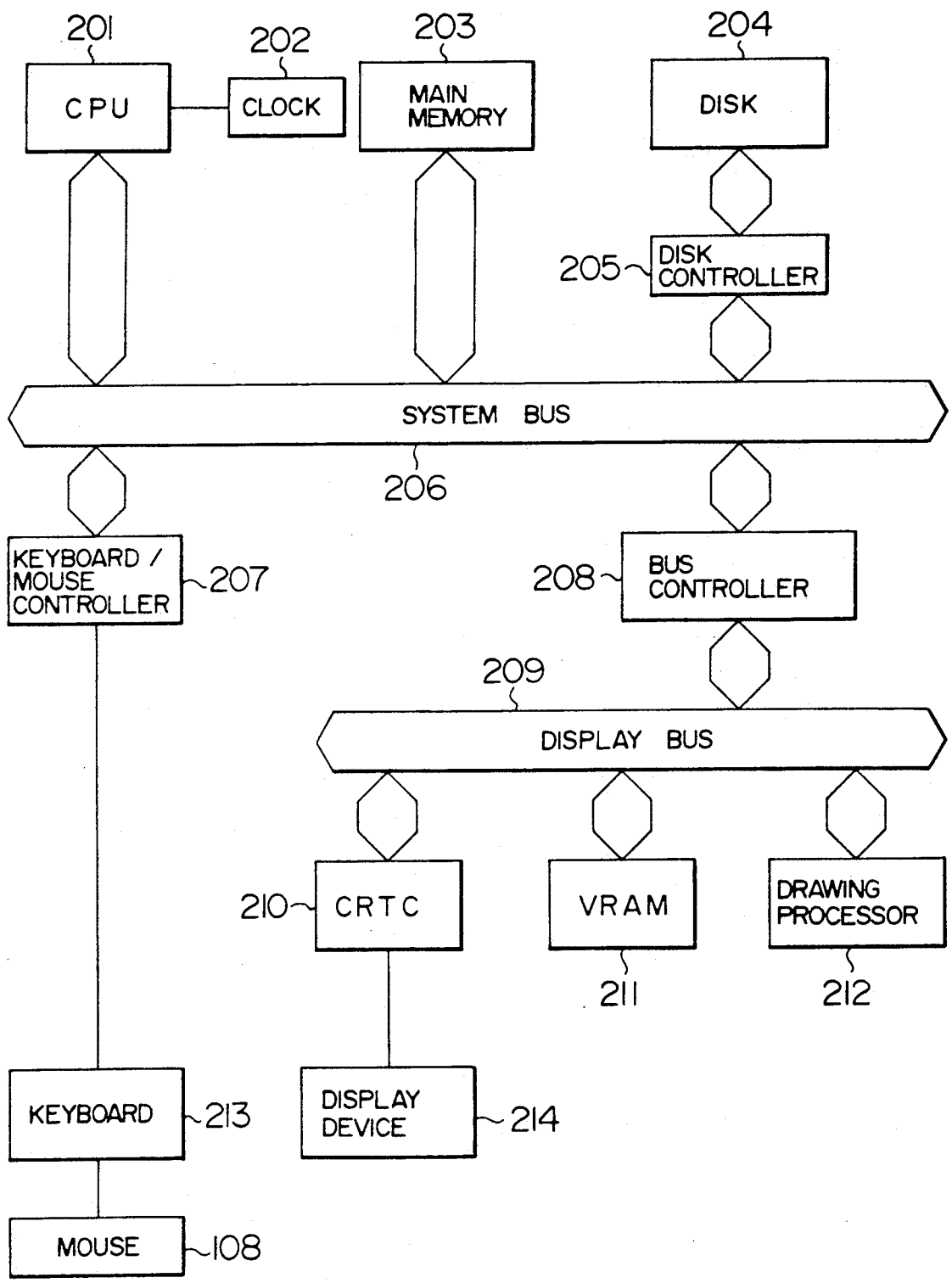
FIG. 2 is a block diagram showing the whole construction of an apparatus for controlling a display device in accordance with the present invention.

FIG. 2 is a block diagram showing the whole construction of an embodiment of an apparatus for controlling a display device in accordance with the present invention. In FIG. 2, reference numeral 201 designates a CPU (namely, central processing unit), 202 a clock signal generator, 203 a main memory for storing programs and data, 204 a disk, 205 a disk controller, 206 a system bus for transferring data which is used in the whole of the present embodiment, 207 a keyboard/mouse controller connected to a keyboard 213 and the mouse 108, 209 a display bus for transferring data which is used in a display system, 208 a bus controller for connecting the system bus 206 and the display bus 209, 212 a drawing processor, 211 a VRAM (namely, video random access memory), and 210 a CRTC (namely, CRT controller) connected to a display device 214.

Figure 3:
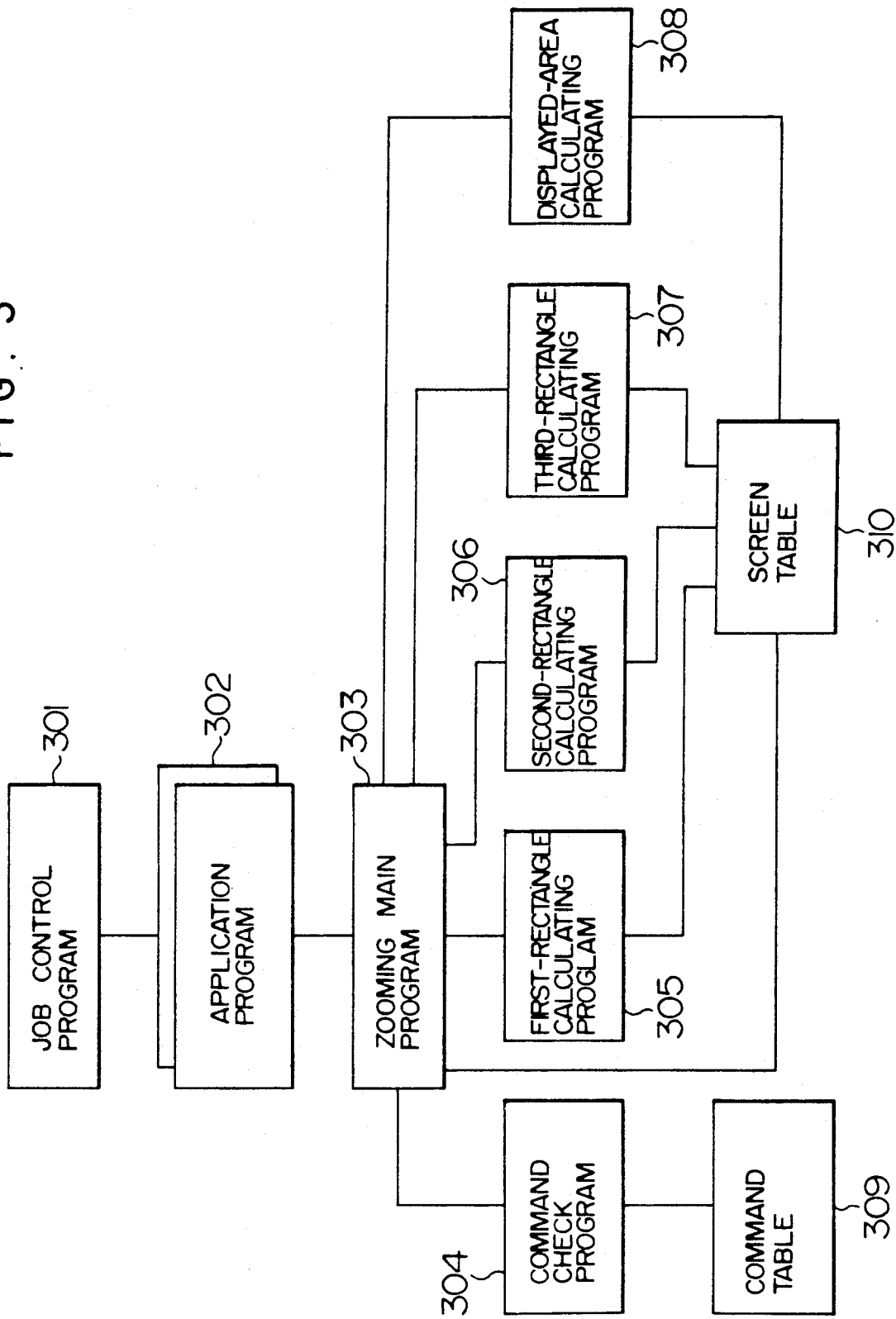
FIG. 3 is a block diagram showing a relation among various kinds of programs and data.

FIG. 3 shows a relation among various kinds of programs and data which are stored in the main memory 203. In FIG. 3, reference numeral 301 designates a job control program for controlling the execution of each of the following programs, 302 an application program, 303 a zooming main program, 304 a command check program for checking a command which is selected by the mouse, 305 a program for calculating the display position of the first rectangular frame 111, 306 a program for calculating the display position of the second rectangular frame 112, 307 a program for calculating the display position of the third rectangular frame 115, 308 a program for calculating a displayed area which is specified by the movement of the cursor, 309 a command table for indicating display positions of commands, and 310 a screen table for storing information on the logical and physical screens.

FIG. 4 shows the contents of the screen table 310. In FIG. 4, reference numeral 401 designates an area for storing the value of width LW of the logical screen 104, 402 an area for storing the value of height LH of the logical screen 104, 403 an area for storing the values of X- and Y-coordinates WX1 and WY1 of the upper left corner of the displayed area 105, 404 an area for storing the values of X- and Y-coordinates WX2 and WY2 of the lower right corner of the displayed area 105, 405 an area for storing the zooming ratio of X-coordinates, 406 an area for storing the zooming ratio of Y-coordinates, 407 an area for storing the values of X- and Y-coordinates VX1 and VY1 of the upper left corner of the viewport 102 included in the physical screen 101, 408 an area for storing the values of X- and Y-coordinates VX2 and VY2 of the lower right corner of the viewport 102, 409 an area for storing the values of X- and Y-coordinates R1X1 and R1Y1 of the upper left corner of the first rectangular frame 111, 410 an area for storing the values of X- and Y-coordinates R1X2 and R1Y2 of the lower right corner of the first rectangular frame 111, 411 an area for storing the values of X- and Y-coordinates R2X1 and R2Y1 of the upper left corner of the second rectangular frame 112, 412 an area for storing the values of X- and Y-coordinates R2X2 and R2Y2 of the lower right corner of the second rectangular frame 112, 413 an area for storing the values of X- and Y-coordinates R3X1 and R3Y1 of the upper left corner of the third rectangular frame 115, and 414 an area for storing the values of X- and Y-coordinates R3X2 and R3Y2 of the lower right corner of the third rectangular frame 115.

Figure 5:
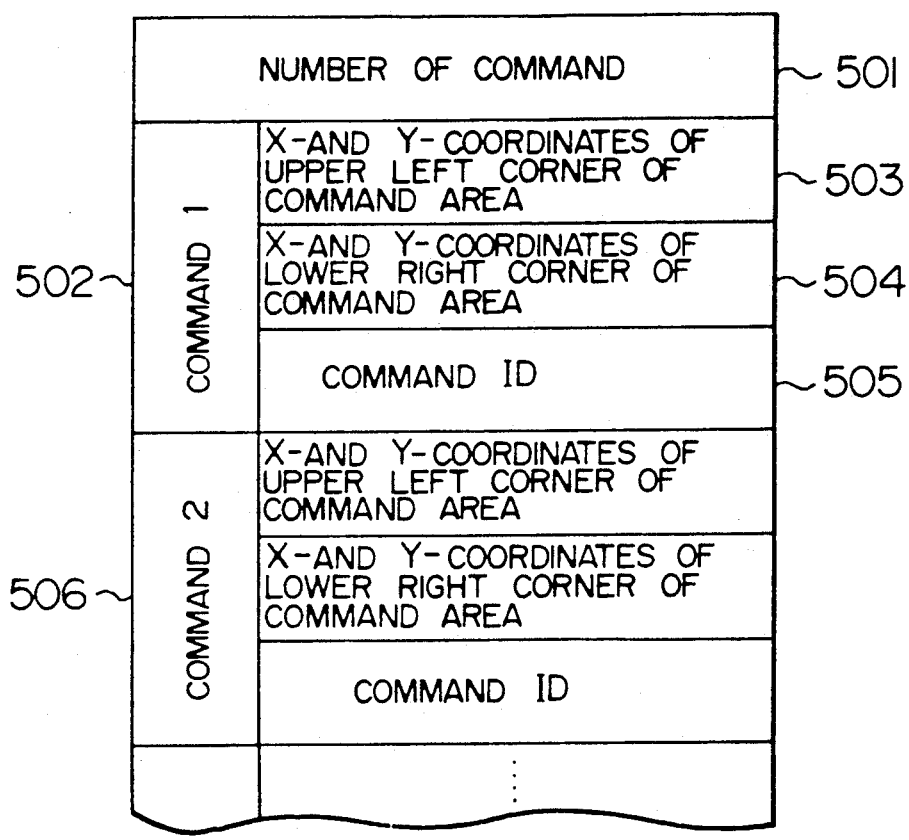
FIG. 5 is a schematic diagram showing the contents of the command table of FIG. 3.

FIG. 5 shows the contents of the command table 308. In FIG. 5, reference numeral 501 designates an area for storing the number of commands, 502 an area for storing information on a command-1, and 506 an area for storing information on a command-2. The area 502 includes a sub-area 503 for storing the coordinate values of the upper left corner of a command indicating area (namely, command area) where the command-1 is indicated, a sub-area 504 for storing the coordinate values of the lower right corner of the above command area, and a sub-area 505 for storing a command ID indicative of the kind of the command-1. Although only the command-1 and command-2 are shown in FIG. 5, the command table 308 also contains information on a command-3 and so forth.

Figure 6A:
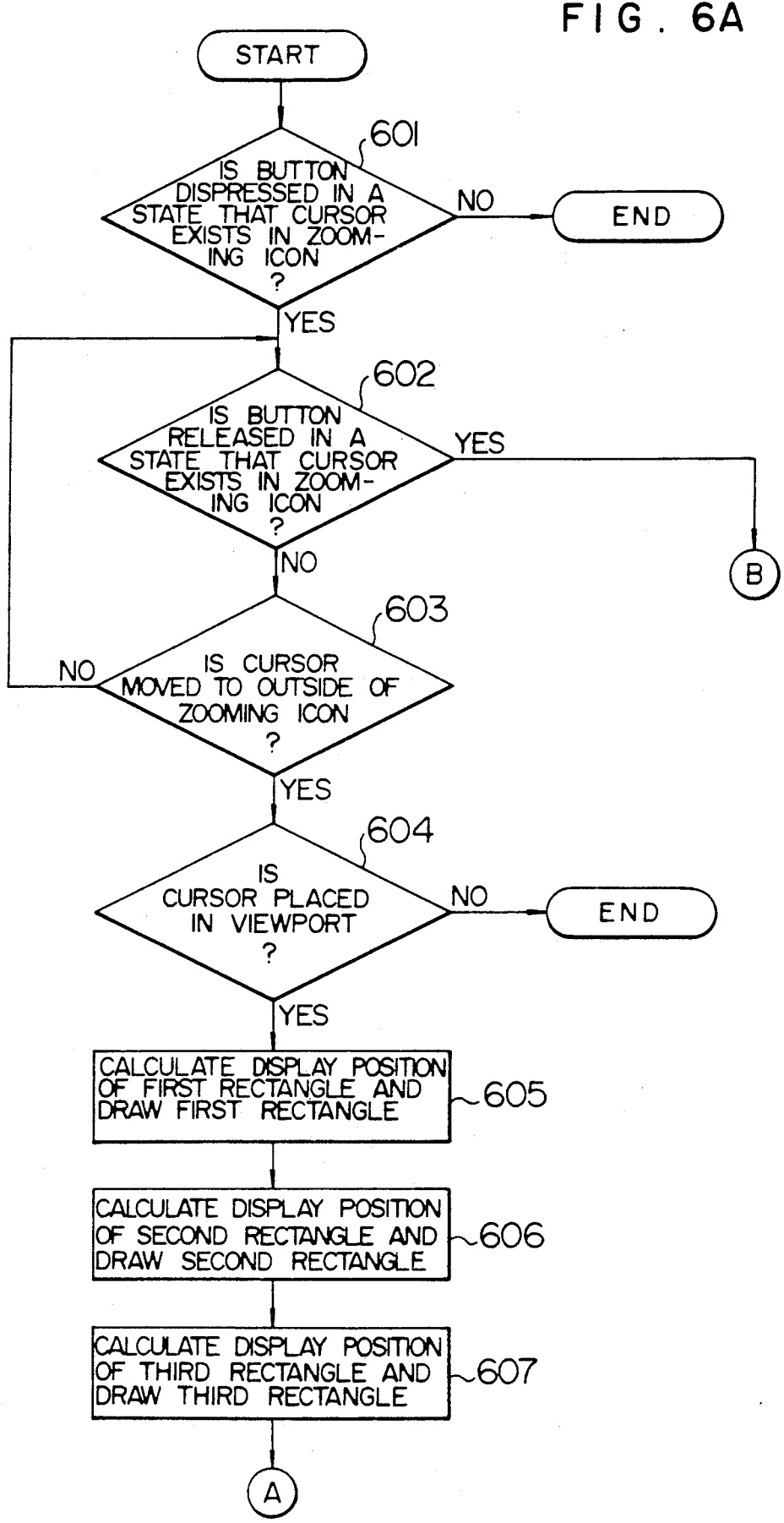
FIGS. 6A and 6b are flow charts showing the processing executed by a zooming main program.
Figure 6B:
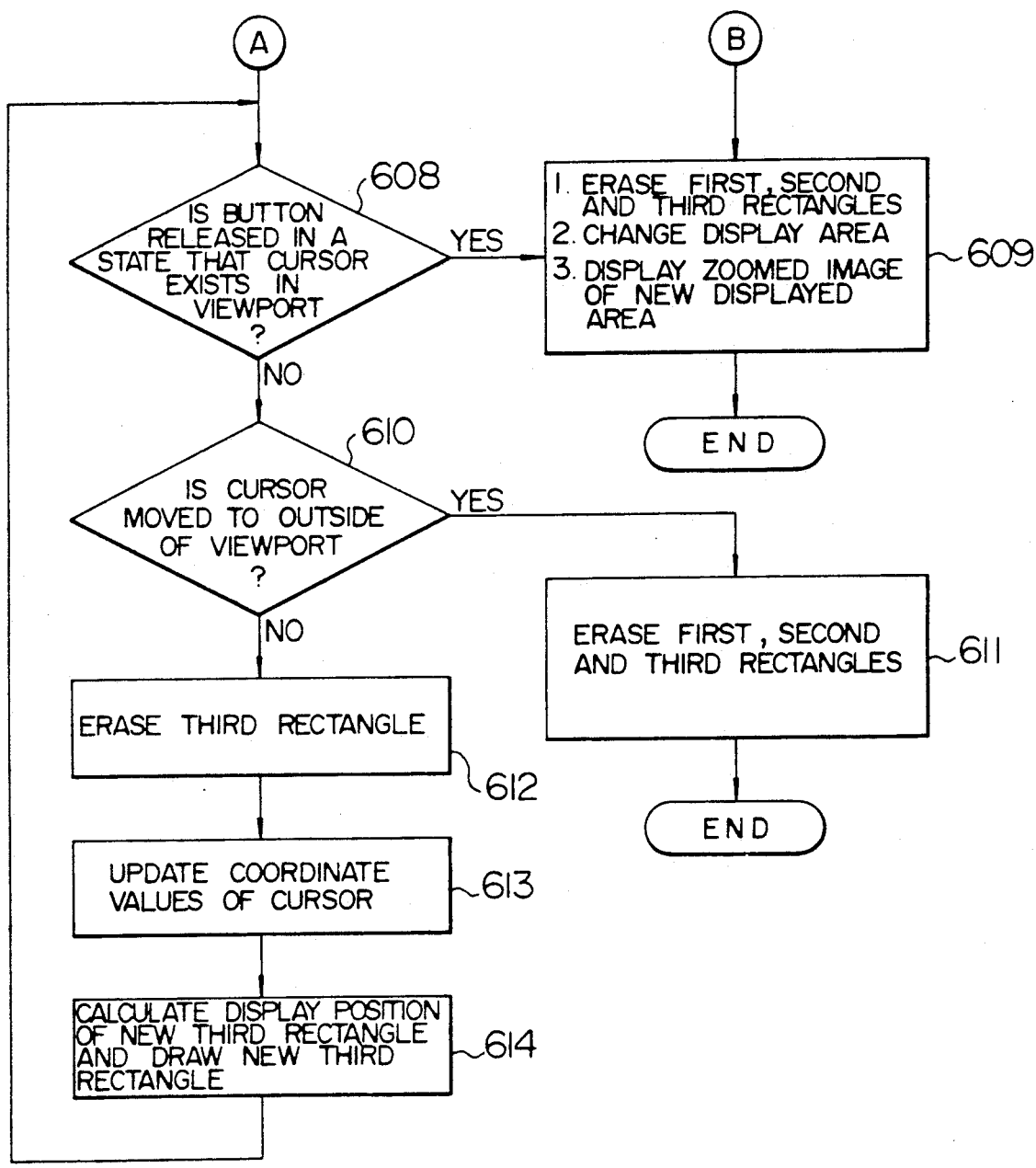

FIGS. 6A and 6b are flow charts which show the processing executed by the zooming main program. In step 601, the command check program 304 is read out from the main memory, to check whether or not the button of the mouse is depressed in a state the cursor is placed in the zooming icon 106. The command check program 304 will be explained later in detail, with reference to FIG. 7. In a case where the button is depressed in the above state, the processing in step 602 is carried out. While, in a case where the button is not depressed in the above state, processing terminates without requiring any other operation. In the step 602, it is checked whether or not the button is released in the state that the cursor exists in the zooming icon 106. When the button is released in the above state, the zooming processing in step 609 is carried out. While, in a case where the button is not released in the above state, the processing in step 603 is carried out. In the step 603, it is checked whether or not the cursor is moved to the outside of the zooming icon 106. When the cursor is moved to the outside of icon 106, the processing in step 604 is carried out. When the cursor is not moved to the outside of the icon 106, the processing in the step 602 is again carried out. In the step 604, it is checked whether or not the cursor 107 exists in the viewport 102. In more detail, it is checked whether or not the coordinate values of the cursor 107 exist in a range restricted by the X- and Y-coordinates VX1 and VY1 of the upper left corner of the viewport 102 and the X- and Y-coordinates VX2 and VY2 of the lower right corner thereof. When the coordinate values of the cursor exist in the above range, the processing in step 605 is carried out. When the cursor does not exist in the viewport, processing terminates without requiring any other operation. In the step 605, the first-rectangular calculating program 305 is read out from the main memory, to calculate the coordinate values of the upper left and lower right corners of the first rectangular frame 111, thereby forming the first frame 111. The program 305 will be explained later in detail, with reference to FIG. 8. In step 606, the second-rectangle calculating program 306 is read out, to calculate the coordinate values of the upper left and lower right corners of the second rectangular frame 112, thereby forming the second frame 112. The program 306 will be explained later in detail, with reference to FIG. 9. In step 607, the third-rectangle calculating program 307 is read out, to calculate the coordinate values of the upper left and lower right corners of the third rectangular frame 115, thereby forming the third frame 115. The program 307 will be explained later in detail, with reference to FIG. 10. In step 608, the X- and Y-coordinates of the cursor 107 are compared with the X- and Y-coordinates of the upper left corner of the viewport 102 which are stored in the area 407 of FIG. 4, and are compared with the X- and Y-coordinates of the lower right corner of the viewport 102 which are stored in the area 408 of FIG. 4, to check whether or not the button of the mouse is released in a state that the cursor exists in the viewport 102. When the button of the mouse is released in the above state, the processing in step 609 is carried out. In the step 609, the first frame 111, the second frame 112 and the third frame 115 are erased. Next, the program 308 for calculating the desired, displayed area 116 is read out, to substitute the desired, display area 116 corresponding to the frame 117 for the displayed area 115. The program 308 will be explained later in detail, with reference to FIG. 11. Further, the screen table 310 is updated in accordance with the frame 117, and then an enlarged or contracted image is displayed. When the button of the mouse is not released in the state that the cursor exists in the viewport 102, the processing in step 610 is carried out. In the step 610, it is checked whether or not the cursor is moved to the outside of the viewport 102. In a case where the cursor is moved to the outside of the viewport 102, processing is considered to be cancelled, and thus the processing in step 611 is carried out. That is, in the step 611, the first frame 111, the second frame 112 and the third frame 115 are erased, and processing terminates without any additional operation. In a case where the cursor is not moved to the outside of the viewport 102, the processing in step 612 is carried out, that is, the third frame is erased. In step 613, the coordinate values of the cursor are updated. In step 614, the third-rectangle calculating program 307 is read out, to calculate the coordinate values of the upper left and lower right corners of the new third frame, thereby plotting the new third frame. Then, the processing in the step 608 is again carried out. A zooming operation can be performed in the above-mentioned manner.

FIG. 7 is a flow chart which shows the processing executed by the command check program 304 for checking whether or not the cursor 107 exists in the zooming icon 106. In step 701, the value of a counter provided in a work area is first set to one. In step 702, the value of the counter is compared with the number of commands which is stored in the area 501 of the command table 309. In a case where the value of the counter is greater than the number of commands, the processing in step 703 is carried out, that is, a response indicative of "NO" is sent to the zooming main program 303 which was used to read out the command check program 304. In a case where the value of the counter is not greater than the number of commands, the processing in step 704 is carried out. In the step 704, information on a command corresponding to the value of the counter is read out. In step 705, the X- and Y-coordinates of the cursor 107 are compared with the X- and Y-coordinates of the upper left corner of a command indicating area and are also compared with the X- and Y-coordinates of the lower right corner of the command indicating area, to check whether or not the cursor 107 exists in the command indicating area. It is needless to say that the X- and Y-coordinates of each of the upper left and lower right corners are included in the read-out information. In a case where the cursor 107 exists outside of the command indicating area, the value of the counter is incremented by one in step 706, and then the processing in the step 702 is again carried out. In a case where the cursor 107 exists in the command indicating area, it is checked in step 707 whether or not the command ID included in the read-out information indicates a zooming command. In a case where the command ID indicates the zooming command, a response indicative of "YES" is sent to the zooming main program 303 (step 708). In a case where the command ID does not indicate the zooming command, a response indicative of "NO" is sent to the zooming main program 303 (step 709).

Figure 8:
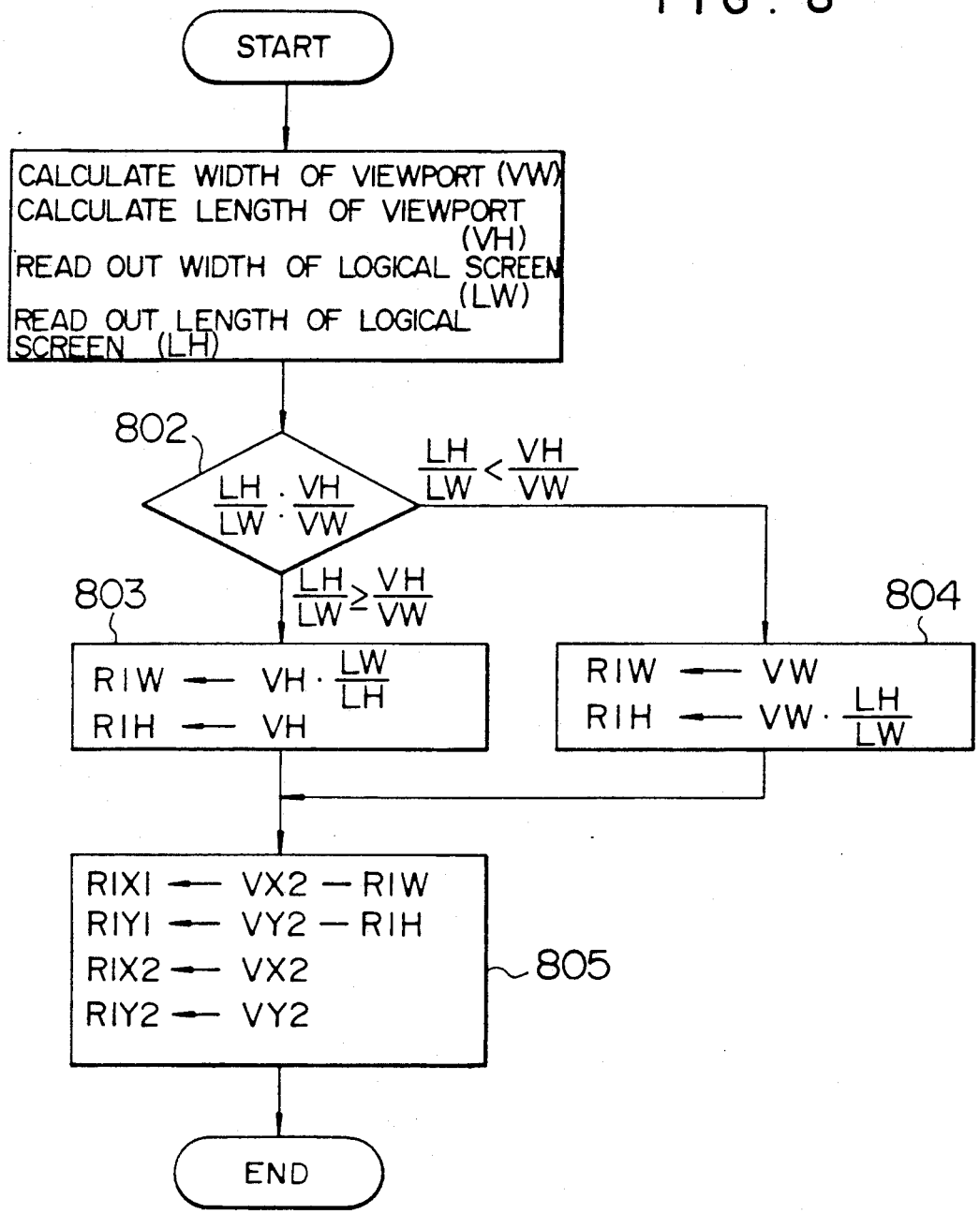
FIG. 8 is a flow chart showing the processing executed by a program for calculating the first rectangle position.

FIG. 8 is a flow chart which shows the processing executed by the first-rectangle calculating program 305. In step 801, the width VW of the viewport 102 and the height VH thereof are determined from the X- and Y-coordinates VX1 and VY1 of the upper left corner of the viewport 102 and the X- and Y-coordinates VX2 and VY2 of the lower right corner of the viewport 102, that is, the width VW and the height VH are given by the following equations:

$$VW = VX2 - VX1, \quad VH = VY2 - VY1$$

The coordinates VX1, VY1, VX2 and VY2 are listed on the screen table 310. Further, the width LW of the logical screen and the height LH thereof are read out from the areas 401 and 402 of the table 310. In step 802, a ratio LH/LW is compared with the ratio VH/VW. In a case where the ratio LH/LW is greater than or equal to the ratio VH/VW, the processing in step 803 is carried out. In the step 803, the width R1W of the first rectangular frame 111 and the height R1H thereof are determined by the following equations:

$$R1W = VH \times \frac{LW}{LH}, \quad R1H = VH$$

In a case where the ratio LH/LW is smaller than the ratio VH/VW, the processing in step 804 is carried out. In the step 804, the width R1W and the height R1H of the first rectangular frame are determined by the following equations:

$$R1W = VW, \quad R1H = VW \times \frac{LH}{LW}$$

In step 805, the X- and Y-coordinates of the upper left corner of the first rectangular frame 111 and the X- and Y-coordinates of the lower right corner of the first rectangular frame 111 are determined by the following equations:

$$R1X1 = VX2 - R1W, \quad R1Y1 = VY2 - R1H$$
$$R1X2 = VX2, \quad R1Y2 = VY2$$

where R1X1 indicates the X-coordinate of the upper left corner of the first rectangular frame 111, R1Y1 the Y-coordinate of the upper left corner of the first rectangular frame 111, R1X2 the X-coordinate of the lower right corner of the first rectangular frame 111, R1Y2 the Y-coordinate of the lower right corner of the first rectangular frame 111, VX2 the X-coordinate of the lower right corner of the viewport, VY2 the Y-coordinate of the lower right corner of the viewport, R1W the width of the first rectangular frame 111, and R1H the height of the first rectangular frame 111. The X- and Y-coordinates of each of the upper left and lower right corners of the first rectangular frame 111 can be determined in the above-mentioned manner.

Figure 9:
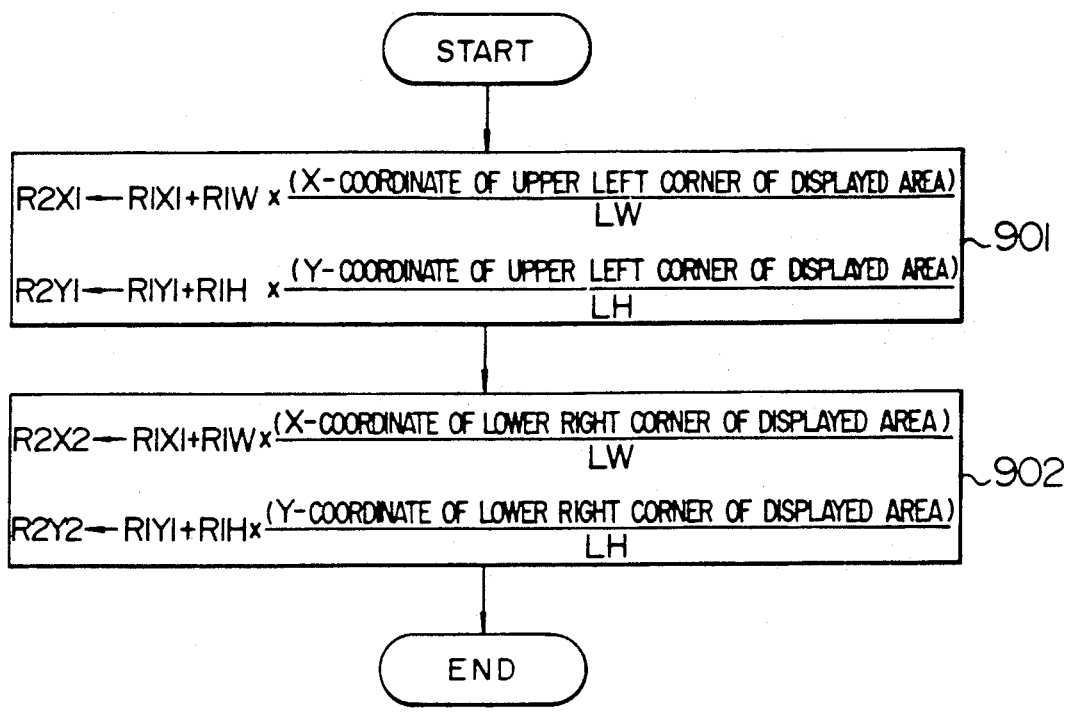
FIG. 9 is a flow chart showing the processing executed by a program for calculating the second rectangle position.

FIG. 9 is a flow chart which shows the processing executed by the second-rectangle calculating program 306 for determining the positions of the upper left and lower right corners of the second rectangular frame 112. In step 901, the X- and Y-coordinates of the upper left corner of the second rectangular frame 112 are determined by the following equations:

$$R2X1 = R1X1 - R1W \times WX1/LW$$

$$R2Y1 = R1Y1 - R1H \times WY1/LH$$

In step 902, the X- and Y-coordinates of the lower right corner of the second rectangular frame 112 are determined by the following equations:

$$R2X2 = R1X1 + R1W \times WX2/LW$$

$$R2Y2 = R1Y1 + R1H \times WY2/LH$$

In four equations mentioned above, R2X1 indicates the X-coordinate of the upper left corner of the second rectangular frame 112, R2Y1 the Y-coordinate of the upper left corner of the second rectangular frame 112, R2X2 the X-coordinate of the lower right corner of the second rectangular frame 112, R2Y2 the Y-coordinate of the lower right corner of the second rectangular frame 112, R1X1 the X-coordinate of the upper left corner of the first rectangular frame 111, R1Y1 the Y-coordinate of the upper left corner of the first rectangular frame 111, R1W the width of the first rectangular frame 111, R1H the height of the first rectangular frame 111, WX1 the X-coordinate of the upper left corner of the displayed area 105 on the logical screen 104, WY1 the Y-coordinate of the upper left corner of the displayed area 105, WX2 the X-coordinate of the lower right corner of the displayed area 105, WY2 the Y-coordinate of the lower right corner of the displayed area 105, LW the width of the logical screen 104 written in the area 401 of the screen table 310, and LH the height of the logical screen 104 written in the area 402 of the screen table 310. The display positions of the upper left and lower right corners of the second rectangular frame 112 are determined by the above processing.

Figure 10:
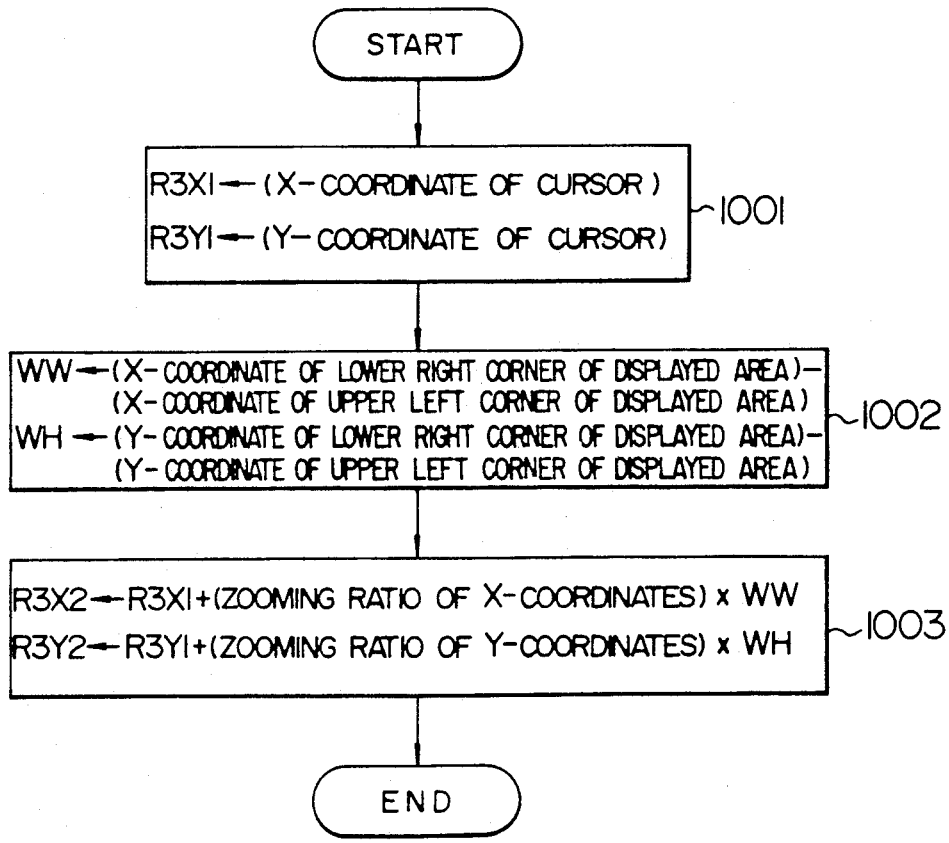
FIG. 10 is a flow chart showing the processing executed by a program for calculating the third rectangle position.

FIG. 10 is a flow chart which shows the processing executed by the third-rectangle calculating program 307 for determining the display positions of the upper left and lower right corners of the third rectangular frame 115. In step 1001, the X- and Y-coordinates of the cursor 107 are written, as the X- and Y-coordinates of the upper left corner of the third rectangular frame 115, in the area 413 of the screen table 310. In step 1002, the width and height of the displayed area 105 are determined from the contents of the screen table 310 by the following equations:

$$WW = WX2 - WX1, \quad WH = WY2 - WY1$$

In step 1003, the X- and Y-coordinates of the lower right corner of the third rectangular frame 115 are determined by the following equations:

$$R3X2 = R3X1 + SX \times WW, \quad R3Y2 = R3Y1 + SY \times WH$$

In four equations mentioned above, WW indicates the width of the displayed area 105, WH the height of the displayed area 105, WX1 the X-coordinate of the upper left corner of the displayed area 105, WX2 the X-coordinate of the lower right corner of the displayed area 105, WY1 the Y-coordinate of the upper left corner of the displayed area 105, WY2 the Y-coordinate of the lower right corner of the displayed area 105, R3X1 the X-coordinate of the upper left corner of the third rectangular frame 115, R3X2 the X-coordinate of the lower right corner of the third rectangular frame 115, R3Y1 the Y-coordinate of the upper left corner of the third rectangular frame 115, R3Y2 the Y-coordinate of the lower right corner of the third rectangular frame 115, SX the zooming ratio of X-coordinates which is specified and written in the area 405 of the screen table 310, and SY the zooming ratio of Y-coordinates which is specified and written in the area 406 of the screen table 310. The display position of the third rectangular frame 115 can be calculated in the above-mentioned manner.

Figure 11:
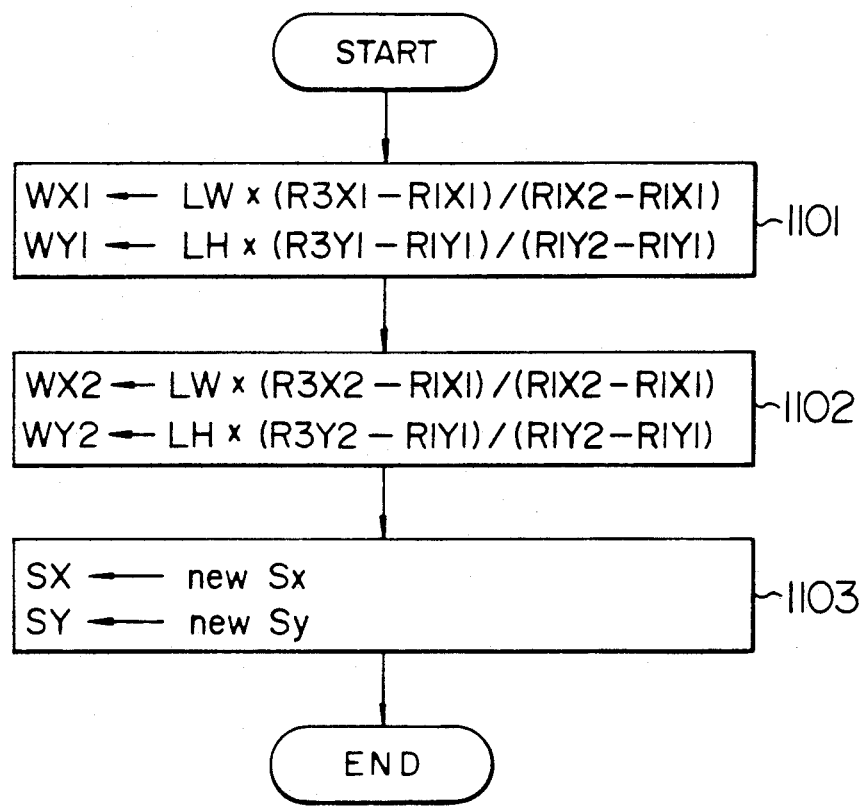
FIG. 11 is a flow chart showing the processing executed by a program for calculating the coordinates of a displayed area.

FIG. 11 is a flow chart which shows the processing executed by the program 308 for calculating the positions of the upper left and lower right corners of the new displayed area 116 specified by the rectangular frame 117. In step 1101, the position of the upper left corner of the new displayed area 116 is calculated by the following equations:

$$WX1 = LW \times (R3X1 - R1X1)/(R1X2 - R1X1)$$

$$WY1 = LH \times (R3Y1 \times R1Y1)/(R1Y2 - R1Y1)$$

Further, in step 1102, the position of the lower right corner of the new displayed area 116 is calculated by the following equations:

$$WX2 = LW \times (R3X2 - R1X1)/(R1X2 - R1X1)$$

$$WY2 = LH \times (R3Y2 \times R1Y1)/(R1Y2 - R1Y1)$$

In four equations mentioned above, WX1 indicates the X-coordinate of the upper left corner of the displayed area 116, WY1 the Y-coordinate of the upper left corner of the displayed area 116, WX2 the X-coordinate of the lower right corner of the displayed area 116, WY2 the Y-coordinate of the lower right corner of the displayed area 116, LW the width of the logical screen, LH the height of the logical screen, R3X1 the X-coordinate of the upper left corner of the rectangular frame 117, R3Y1 the Y-coordinate of the upper left corner of the rectangular frame 117, R3X2 the X-coordinate of the lower right corner of the rectangular frame 117, R3Y2 the Y-coordinate of the lower right corner of the rectangular frame 117, R1X1 the X-coordinate of the upper left corner of the first rectangular frame 111, R1X2 the X-coordinate of the lower right corner of the first rectangular frame 111, R1Y1 the Y-coordinate of the upper left corner of the first rectangular frame 111, and R1Y2 the Y-coordinate of the lower right corner of the first rectangular frame 111. In step 1103, a new SX (namely, newly specified zooming ratio of X-coordinates) is written in the area 405 of the screen table 310, and a new SY (namely, newly specified zooming ratio of Y-coordinates) is written in the area 406 of the screen table. As mentioned above, the positions of the upper left and lower right corners of the new displayed area 116 are determined, and the new SX and new SY are specified. Thus, the contents of each of the areas 403, 404, 405 and 406 of the screen table 310 are updated.

In the above, explanation has been made of a case where a single window is formed in a display screen. However, the present invention is not limited to the above case, but is applicable to a display device capable of forming a multi-window.

As can be seen from the above explanation, according to the present invention, an indication for requiring a zooming operation and an indication for requiring a change of displayed area are given, by a one-touch operation, to a display device which is required to display a logical screen larger in size than a physical screen, and which has a zooming function. Thus, the operation procedure becomes simpler, as compared with the conventional method, and the operability of the display device is improved. Further, a desired logical area can be directly displayed without displaying other logical areas, and hence an access time can be shortened.

We claim:

1. An apparatus for controlling a display device having a zooming function, the display device being capable of displaying on a physical screen a logical screen different in size from the physical screen, the apparatus comprising:

means for displaying on the physical screen a first frame similar in shape to the entire logical screen;

means for displaying on the physical screen, within the first frame, a second frame similar in shape to a first area of the logical screen subjected to a zooming operation;

means for moving and zooming the second frame to a desired position on the physical screen with aid of a coordinate input device to specify a desired area of the logical screen as a third frame different in size from said second frame; and, means for displaying on the physical screen the third frame, while not displaying on the physical screen, areas of the logical screen out of the desired area.

2. The apparatus according to claim 1, further comprising:

means for displaying on the physical screen a figure indicative of a zooming command;

means for comparing a position coordinate specified by the coordinate input device with a display position of the figure; and, means for checking whether or not the position coordinate specified by the coordinate input device exists in the figure, after an action for specifying a zooming operation is taken, to perform only the zooming operation when the specified position coordinate exists in the figure.

3. The apparatus of claim 1 further comprising:

third frame generating means for generating said third frame on the physical screen, the third frame being smaller than the second frame; and, means for moving the third frame to the desired position on the physical screen with aid of said coordinate input device to specify the desired area on the logical screen.

4. The apparatus of claim 3 wherein the third frame generating means generates the third frame on the physical screen as an expanded version of the second frame.

5. A method of controlling a display device having a zooming function, comprising the steps of:

displaying on a physical screen of the display device a first frame different in size from but similar in shape to an entire logical screen;

selecting a first position of a first logical area of the logical screen, a zoomed image of the first logical area to be displayed on the physical screen;

displaying a second frame on the physical screen at a physical screen position corresponding to the first position of the first logical area on the logical screen, the second frame being similar in shape to the first logical area, the size of the second frame being equal to a product of the size of the first logical area and a ratio of the size of the first frame to the size of the logical screen;

moving and zooming the second frame to a desired position within said first frame as a third frame; and, displaying a zoomed image of a desired logical area on the physical screen, the desired logical area being located on the logical screen at a position corresponding to the third frame on the physical screen.

6. The method according to claim 5, further comprising:
determining the position of a second logical area being displayed on the physical screen; and,
displaying the third frame, which is similar in shape to the second logical area and whose size is equal to a product of the second logical area and a ratio of the size of the first frame to the size of the logical screen, on the physical screen at a position corresponding to the position of the second logical area on the logical screen.

7. The method of claim 5 further comprising the steps of:
forming said third frame on the physical screen by contracting the second frame; and,
moving the third frame to the desired position within said first frame.

8. The method of claim 7 wherien the forming step forms the third frame on the physical screen by expanding the second frame.

9. A display screen control method for use with a display device having a logical screen larger in size than a physical screen on which information of the logical screen is capable of being displayed, the method comprising the steps of:
displaying on the physical screen a first window area which is a first subscreen of the logical screen;
changing the display on the physical screen to a first display screen shape related to the size of the logical screen in response to a first command, and displaying in the first display screen shape displayed on the physical screen a second display screen shape similar to the first window area which is the first subscreen of the logical screen, the second display screen shape being displayed within the first display screen shape at a position corresponding to a position of the first window area in the logical screen;
displaying within the second display screen shape a third display screen shape, the third display screen shape being a second subscreen of the logical screen and selectively different in size than the first subscreen of the logical screen;
moving the third display screen shape to a desired position within the first display screen shape so as to determine a second window area which is within the logical screen and which is desired to be selected from the logical screen and displayed on the physical screen; and,
switching the display on the physical screen to the second window area selected by the third display screen shape moved to the desired position in response to a second command.

10. The method of claim 9 further comprising the steps of:
changing the display on the physical screen to a first rectangle related to the size of the logical screen in response to a first command, and displaying in the first rectangle displayed on the physical screen a second rectangle similar to the first window area which is the first subscreen of the logical screen; and,
displaying within the second rectangle a third rectangle, the third rectangle being a second subscreen of the logical screen and smaller than the first subscreen of the logical screen.

11. A display screen control apparatus comprising:
a display device means having a logical screen larger in size than a physical screen on which information of the logical screen is capable of being displayed;
first window display means for displaying on the physical screen a first window area which is a first subscreen of the logical screen;
means for changing the display on the physical screen to a first display screen shape related to the size of the logical screen in response to a first command, and means for displaying in the first display screen shape displayed on the physical screen a second display screen shape similar to the first window area which is the first subscreen of the logical screen, the second display screen shape at a position corresponding to a position of the first window area in the logical screen;
means for displaying within the second display screen shape a third display screen shape, the third display screen shape being a second subscreen of the logical screen and selectively different in size than the first subscreen of the logical screen;
pointer means for moving the third display screen shape to a described position within the first display screen shape so as to determine a second window area which is within the logical screen and which is desired to be selected from the loical screen and displayed on the physical screen; and,
switching means for switching the display on the physical screen to the second window area selected by the third display screen shape moved to the desired position in response to a second command.

12. The apparatus of claim 11 further comprising:
means for changing the display on the physical screen to a first rectangle related to the size of the logical screen in response to a first command, and means for displaying in the first rectangle displayed on the physical screen a second rectangle similar to the first window area which is the first subscreen of the logical screen; and,
means for displaying within the second rectangle a third rectangle, the third rectangle being a second subscreen of the logical screen and smaller than the first subscreen of the logical screen.

* * * * *